(12) United States Patent
Vinciarelli

(10) Patent No.: US 7,420,825 B2
(45) Date of Patent: Sep. 2, 2008

(54) ADAPTIVELY CONFIGURED VOLTAGE TRANSFORMATION MODULE ARRAY

(75) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 0 days.

(21) Appl. No.: 11/639,716

(22) Filed: Dec. 15, 2006

(65) Prior Publication Data

US 2007/0091649 A1 Apr. 26, 2007

Related U.S. Application Data

(62) Division of application No. 10/785,465, filed on Feb. 24, 2004, now Pat. No. 7,170,764.

(51) Int. Cl.
*H02J 1/00* (2006.01)
*H02M 3/335* (2006.01)
(52) U.S. Cl. .......................................... 363/65; 307/82
(58) Field of Classification Search ................. 363/65, 363/67–71; 307/82, 83, 85–87, 113, 116, 307/125, 126, 130, 131
See application file for complete search history.

(56) References Cited

U.S. PATENT DOCUMENTS

| | | | |
|---|---|---|---|
| 4,533,986 A | 8/1985 | Jones | |
| 4,648,017 A | 3/1987 | Nerone | |
| 4,841,220 A | 6/1989 | Tabisz et al. | |
| 4,853,832 A | 8/1989 | Stuart | |
| 4,855,888 A | 8/1989 | Henze et al. | |
| 4,860,184 A | 8/1989 | Tabisz et al. | |
| 4,931,716 A | 6/1990 | Jovanovic et al. | |
| 5,508,905 A * | 4/1996 | Reichard | 363/71 |
| 5,615,093 A | 3/1997 | Nalbant | |
| 5,625,545 A | 4/1997 | Hammond | |
| 5,682,303 A * | 10/1997 | Goad | 363/71 |
| 5,767,660 A | 6/1998 | Schmidt | |
| 5,786,992 A | 7/1998 | Vinciarelli et al. | |
| 5,999,417 A | 12/1999 | Schlecht | |
| 6,222,742 B1 | 4/2001 | Schlecht | |
| 6,340,851 B1 * | 1/2002 | Rinaldi et al. | 307/82 |

(Continued)

OTHER PUBLICATIONS

Baker, "High Frequency Power Conversion With FET-Controlled Resonant Charge Transfer," PCI Proceedings, Apr. 1983.

(Continued)

*Primary Examiner*—Matthew V. Nguyen
(74) *Attorney, Agent, or Firm*—Fish & Richardson P.C.

(57) ABSTRACT

A method and apparatus for adaptively configuring an array of voltage transformation modules is disclosed. The aggregate voltage transformation ratio of the adaptive array is adjusted to digitally regulate the output voltage for a wide range of input voltages. An integrated adaptive array having a plurality of input cells, a plurality of output cells, or a plurality of both is also disclosed. The input and output cells may be adaptively configured to provide an adjustable transformer turns ratio for the adaptive array or in the case of an integrated VTM, an adjustable voltage transformation ratio for the integrated VTM. A controller is used to configure the cells and provide digital regulation of the output. A converter having input cells configured as a complementary pair, which are switched out of phase, reduces common mode current and noise. Series connected input cells are used for reducing primary switch voltage ratings in a converter and enabling increased operating frequency or efficiency.

42 Claims, 8 Drawing Sheets

U.S. PATENT DOCUMENTS

| | | |
|---|---|---|
| 6,511,764 B1 | 1/2003 | Marten |
| 6,538,414 B1 | 3/2003 | Tsuruga et al. |
| 6,608,770 B2 | 8/2003 | Vinciarelli et al. |
| 6,788,033 B2 | 9/2004 | Vinciarelli |
| 6,856,283 B2* | 2/2005 | Jacobson et al. ............ 342/368 |
| 6,992,907 B2* | 1/2006 | Zhang ........................ 363/157 |
| 7,170,764 B2 | 1/2007 | Vinciarelli |
| 7,170,767 B2 | 1/2007 | Bixel |
| 7,212,419 B2 | 5/2007 | Vinciarelli |
| 2007/0159862 A1* | 7/2007 | Vinciarelli ................... 363/65 |

OTHER PUBLICATIONS

Bo Yang et al., "LLC Resonant Converter for Front End DC-DC Conversino," CPES Seminar 2001, Blacksburg, VA, Apr. 2001.

Bo Yang et al., "Low Q Characteristic of Series Resonant Converter and Its Application," CPES Seminar 2001, Blacksburg, VA, Apr. 2001.

Divan, "Design Considerations for Very High Frequency Resonant Mode DC/DC Converters," IEEE Transactions on Power Electronics, vol. PE-2, No. 1, Jan. 1987.

Erickson and Maksimovic,"fundamentals of Power Electronics," 2$^{nd}$ Edition, Kluwer Academic Publishers, 2001.

Hua et al., "Novel Zero-Voltage Transition PWM Converters," IEEE Transactions on Power Electronics, vol. 9, No. 2, Mar. 1994, p. 605.

Mweene et al, "A High-Efficiency 1.5 kW, 390-50V Half-Bridge Converter Operated at 100% Duty Ratio," APEC '92 Conference Proceedings, 1992, pp. 723-730.

Palz, "Stromversorgung von Satelliten — Wanderfeldröhren hoher Leistung, " ("Power Supply for Satellites — High Capacity Traveling-Wave Tubes"), Siemens Zeitschrift, vol. 48, 1974, pp. 840-846.

Severns and Bloom, "Modern DC-to-Dc Switchmode Power Conversion Circuits," ISBN 0-442-2396-4, pp. 78-111.

Severns and Bloom, *ibid*, at, *e.g.*, pp. 114-117, 136-139.

Steigerwals, "A Comparison of Half-Bridge Resonant Converter Topologies," IEEE Transactions on Power Electronics, vol. 2, No. 2, Apr. 1988.

SynQor, "Preliminary Tech Spec, Narrow Input, Isolated DC/DC Bus Converter," SynQor Document No. 005-2BQ512J, Rev. 7, Aug. 2002.

\* cited by examiner

ADAPTIVELY CONFIGURED VOLTAGE TRANSFORMATION MODULE ARRAY

This application is a divisional of U.S. patent application Ser. No. 10/785,465 filed Feb. 24, 2004, now U.S. Pat. No. 7,170,764, issued Jan. 30, 2007, which is incorporated here by reference.

TECHNICAL FIELD

This invention relates to the field of electrical power conversion and more particularly to regulated power conversion systems.

BACKGROUND

DC-DC converters transfer power from a DC electrical input source to a load by transferring energy between windings of an isolation transformer. The DC output voltage delivered to the load is controlled by adjusting the timing of internal power switching elements (e.g., by controlling the converter switching frequency and/or the switch duty cycle and/or the phase of switches). As defined herein, the functions of a "DC-DC converter" comprise: a) isolation between the input source and the load; b) conversion of an input voltage to an output voltage; and c) regulation of the output voltage. DC-DC converters may be viewed as a subset of a broad class of switching power converters, referred to as "switching regulators," which convert power from an input source to a load by processing energy through intermediate storage in reactive elements. As defined herein, the functions of a "Switching Regulator" comprise: a) conversion of an input voltage to an output voltage, and b) regulation of the output voltage. If the required output voltage is essentially a positive or negative integer (or rational) multiple of the input voltage, the conversion function may also be efficiently performed by a capacitive "Charge Pump," which transfers energy by adding and subtracting charge from capacitors.

Vinciarelli et al, "Efficient Power Conversion" U.S. Pat. No. 5,786,992 disclose expanding the operating voltage range of isolated DC-DC converters by connecting their inputs and/or outputs in series.

Non-resonant full-bridge, half-bridge, and push-pull DC-to-DC transformer topologies are known. See e.g., Severns and Bloom, "Modern DC-to-DC Switchmode Power Conversion Circuits," ISBN 0-442-21396-4, pp. 78-111. Series, parallel, and other resonant forms of switching power converters are also known. See e.g., Steigerwald, "A Comparison of Half-Bridge Resonant Converter Topologies," IEEE Transactions on Power Electronics, Vol. 2, No. 2, April, 1988. Variable frequency, series resonant, half-bridge converters for operation from an input voltage source are described in Baker, "High Frequency Power Conversion With FET-Controlled Resonant Charge Transfer," PCI Proceedings, April 1983, and in Nerone, U.S. Pat. No. 4,648,017. Half-bridge, single-stage, ZVS, multi-resonant, variable frequency converters, which operate from an input voltage source are shown in Tabisz et al, U.S. Pat. No, 4,841,220 and Tabisz et al, U.S. Pat. No, 4,860,184. A variable frequency, full-bridge, resonant converter, in which an inductor is interposed between the input source and the resonant converter is described in Divan, "Design Considerations for Very High Frequency Resonant Mode DC/DC Converters," IEEE Transactions on Power Electronics, Vol. PE-2, No. 1, January, 1987. A variable frequency, ZVS, half-bridge LLC series resonant converter is described in Bo Yang et al, "LLC Resonant Converter for Front End DC-DC Conversion," CPES Seminar 2001, Blacksburg, Va., April 2001. Analysis and simulation of a "Low Q" half-bridge series resonant converter, wherein the term "Low Q" refers to operation at light load, is described in Bo Yang et al, "Low Q Characteristic of Series Resonant Converter and Its Application," CPES Seminar 2001, Blacksburg, Va., April 2001.

Fixed-frequency half-bridge and full-bridge resonant converters are also known in which output voltage control is achieved by controlling the relative timing of switches. A half-bridge, single-stage, ZVS, multi-resonant, fixed-frequency converter that operates from an input voltage source is shown in Jovanovic et al, U.S. Pat. No, 4,931,716. A full-bridge, single-stage, ZVS, resonant, fixed-frequency converter that operates from an input voltage source is shown in Henze et al, U.S. Pat. No. 4,855,888.

A full-bridge, single-stage, ZCS, series-resonant, fixed-frequency converter, operating at a frequency equal to the characteristic resonant frequency of the converter, is shown in Palz, "Stromversorgung von Satelliten—Wanderfeldröbhren hoher Leistung" ("Power Supply for Satellites—High Capacity Traveling-Wave Tubes"), Siemens Zeitschrift, Vol. 48, 1974, pp. 840-846. Half and full-bridge, single-stage, ZVS, resonant, converters, for powering fluorescent tubes are shown in Nalbant, U. S. Pat. No. 5,615,093.

A DC-to-DC Transformer offered for sale by SynQor, Hudson, Mass., USA, called a "BusQor™ Bus Converter," that converts a regulated 48VDC input to a 12 VDC output at a power level of 240 Watts and that can be paralleled with other similar converters for increased output power delivery, and that is packaged in a quarter brick format, is described in data sheet "Preliminary Tech Spec, Narrow Input, Isolated DC/DC Bus Converter," SynQor Document No. 005-2BQ512J, Rev. 7, August, 2002.

The art of resonant power conversion, including operation below or above resonant frequency, utilizing either ZCS or ZVS control techniques and allowing the resonant cycle to be either completed or purposely interrupted, is summarized in Chapter 19 of Erickson and Maksimovic, "Fundamentals of Power Electronics," 2nd Edition, Kluwer Academic Publishers, 2001.

Cascaded converters, in which a first converter is controlled to generate a voltage or current, which serves as the source of input power for a DC-to-DC transformer stage, are known. A discussion of canonical forms of cascaded converters is given in Severns and Bloom, ibid, at, e.g., pp. 114-117, 136-139. Baker, ibid, discusses the use of a voltage pre-regulator cascaded with a half-bridge, resonant, variable-frequency converter. Jones, U.S. Pat. No. 4,533,986 shows a continuous-mode PWM boost converter cascaded with both PWM converters and FM resonant half-bridge converters for improving holdup time and improving the power factor presented to an AC input source. A zero-voltage transition, current-fed, full-bridge PWM converter, comprising a PWM boost converter delivering a controlled current to a PWM, full-bridge converter, is shown in Hua et al, "Novel Zero-Voltage Transition PWM Converters," IEEE Transactions on Power Electronics, Vol. 9, No. 2, March, 1994, p. 605. Stuart, U.S. Pat. No. 4,853,832, shows a full-bridge series-resonant converter cascaded with a series-resonant DC-to-DC transformer stage for providing AC bus power to distributed rectified loads. A half-bridge PWM DC-to-DC transformer stage for use in providing input power to point-of-load DC-DC converters in a DPA is described in Mweene et al, ibid. Schlecht, U.S. Pat. Nos. 5,999,417 and 6,222,742 shows DC-DC converters which incorporate a DC-to-DC transformer stage cascaded with a switching regulator. Vinciarelli, "Buck-Boost DC-DC Switching Power Conversion," U.S. patent application Ser. No. 10/214,859, filed Aug. 8, 2002, assigned to the same assignee as this application and incorporated by reference, discloses a new, high efficiency, ZVS buck-boost converter topology and shows a front-end converter comprising the disclosed topology cascaded with a DC-DC converter and a DC-to-DC transformer.

SUMMARY

In general, one aspect features a method of converting power from an input source for delivery to a load, where the load may vary over a normal operating range. The method uses an array of two or more VTMs where the array has an input for receiving power from the input source and an output for delivering power to the load. Each VTM has an input, an output, and a substantially fixed voltage transformation ratio, $K=V_{out}/V_{in}$, over the normal operating range, where $V_{in}$ is the voltage across the respective VTM input and $V_{out}$ is the voltage across the respective VTM output. Each VTM provides isolation between its input and its output. The method adaptively configures the VTMs in and out of a series connection to adaptively adjust the aggregate voltage transformation ratio of the array and regulate the output voltage.

Implementations of the method may include one or more of the following features. The inputs of the VTMs may be adaptively configured. The outputs of the VTMs may be adaptively configured. The VTMs may use a method of converting power that includes forming a resonant circuit including a transformer and having a characteristic resonant frequency and period. Two or more primary switches may be used to drive the resonant circuit. A switch controller may be used to operate the primary switches in a series of converter operating cycles. Each converter operating cycle may be characterized by two power transfer intervals of essentially equal duration, during which one or more of the primary switches are ON and power is transferred from the input of the VTM to the output of the VTM via the transformer, and voltages and currents in the VTM rise and fall at the characteristic resonant frequency. Each converter operating cycle may be further characterized by two energy-recycling intervals each having an essentially constant duration over the normal operating range during which the primary switches are OFF and magnetizing current may be used to charge and discharge capacitances during the energy-recycling intervals. The switch controller may be used to turn the primary switches OFF essentially at times when the current in a secondary winding returns to zero. The adaptive configuring may be performed in response to changes sensed in the array input voltage. The adaptive configuring may be performed in response to sensed changes in the array output voltage. The VTMs in the array may have voltage transformation ratios that form a binary series. The array may include a main VTM with fixed connections to the array input and output and an auxiliary VTM that is adaptively configured between a series-connection with the main VTM or disconnected from the array. A linear regulator may be used between the array output and the load. A linear regulator may be used between the input source and the array input.

In general, another aspect features a method of converting power from an input source for delivery to a load, where the load may vary over a normal operating range. The method uses an integrated adaptive array having an input, an output, a number, N, of input cells each having a respective number, $P_x$, of turns and a number, M, of output cells each having a respective number, $S_x$, of turns, where N+M is greater than 2. Magnetic coupling is provided between the turns to form a transformer common to each of the input and output cells. The cells may be adaptively configured in and out of a series connection such that the turns of selected ones of the input cells are adaptively connected in series and the turns of selected ones of the output cells are adaptively connected in series to provide an adaptively adjustable transformer turns ratio, which is a function of the ratio of (a) the sum of the number of turns in the selected ones of the series-connected output cells to (b) the sum of the number of turns in the selected ones of the series-connected input cells.

Implementations of the method may include one or more of the following features. The number, M, of output cells may equal 1. The number, N, of input cells may equal 1. The integrated adaptive array may use a method of converting power that includes forming a resonant circuit including the transformer and having a characteristic resonant frequency and period. Two or more primary switches may be used in at least one of the primary cells to drive the resonant circuit. A switch controller may be used to operate the primary switches in a series of converter operating cycles. Each converter operating cycle may be characterized by two power transfer intervals of essentially equal duration, during which one or more of the primary switches are ON and power is transferred from the input of the integrated adaptive array to the output of the integrated adaptive array via the transformer, and voltages and currents in the integrated adaptive array rise and fall at the characteristic resonant frequency. Each converter operating cycle may be further characterized by two energy-recycling intervals each having an essentially constant duration over the normal operating range during which the primary switches are OFF; and magnetizing current may be used to charge and discharge capacitances during the energy-recycling intervals. The switch controller may be used to turn the primary switches OFF essentially at times when the current in a secondary winding returns to zero. The adaptive configuring may be performed in response to sensed changes in the integrated adaptive array input voltage. The adaptive configuring may be performed in response to sensed changes in the integrated adaptive array output voltage. The input or output cells may include a number of turns that form a binary series. A main input cell having a fixed connection to the integrated adaptive array input may be used. An auxiliary input cell may be adaptively configured between a series-connection with the main input cell or disconnected from the integrated adaptive array input. A linear regulator may be used between the integrated adaptive array output and the load. A linear regulator may be used between the input source and the integrated adaptive array input. The number N may be 2 and two of the input cells may be arranged in a pair, each pair comprising a first input cell and a second input cell. A positive-referenced switch and a negative-referenced switch may be used in each of the first and second input cells to form a double-ended drive for the respective turns. The respective turns of the first and second input cells may be connected to induce opposing flux in the transformer when driven by their respective positive-referenced switches. A controller may be adapted to operate the switches of the first and second input cells substantially 180 degrees out of phase such that the positive-referenced switch of the first input cell and the negative-referenced switch of the second input cell are ON together and the negative-referenced switch of the first input cell and the positive-referenced switch of the second input cell are ON together. The positive-referenced switches and the negative-referenced switches may have a maximum voltage rating that is lower than the input voltage. The number N may be a multiple of 2 and all of the input cells may be arranged in pairs. The integrated adaptive array may be an adaptive VTM array and the adjustable transformer turns ratio may provide an adjustable voltage transformation ratio, $K=V_{out}/V_{in}$, where $V_{in}$ is the voltage across the integrated array input and $V_{out}$ is the voltage across the integrated array output.

In general, another aspect features an apparatus for converting power from an input source for delivery to a load, where the load may vary over a normal operating range. The apparatus includes an array of two or more VTMs. The array has an input for receiving power from the input source and an output for delivering power to the load. Each VTM has an input, an output, and a substantially fixed voltage transformation ratio, $K=V_{out}/V_{in}$, over the normal operating range where $V_{in}$ is the voltage across the respective VTM input and $V_{out}$ is the voltage across the respective VTM output. Each VTM provides isolation between its input and its output. Configuration switches are connected to the VTMs for configuring the VTMs in and out of a series connection. The apparatus configures the VTMs in and out of the series connection to adaptively adjust the aggregate voltage transformation ratio of the array and regulate the output voltage.

Implementations of the apparatus may include one or more of the following features.

The configuration switches may be connected to the inputs of the VTMs and the VTM inputs may be adaptively configured. The configuration switches may be connected to the outputs of the VTMs and the VTM outputs may be adaptively configured. A VTMs may have a resonant circuit including a transformer and having a characteristic resonant frequency and period and two or more primary switches may be connected to drive the resonant circuit. A switch controller may be adapted to operate the primary switches in a series of converter operating cycles, each converter operating cycle characterized by two power transfer intervals of essentially equal duration, during which one or more of the primary switches are ON and power is transferred from the input of the VTM to the output of the VTM via the transformer. Voltages and currents in the VTM may rise and fall at the characteristic resonant frequency. Each converter operating cycle may be further characterized by two energy-recycling intervals each having an essentially constant duration over the normal operating range during which the primary switches are OFF. Magnetizing current may be used to charge and discharge capacitances during the energy-recycling intervals. The switch controller may be adapted to turn the primary switches OFF essentially at times when the current in a secondary winding returns to zero. The VTMs may be configured in response to changes in the sensed array input voltage. The VTMs may be configured in response to changes in the sensed array output voltage. The VTMs may have voltage transformation ratios that form a binary series. The array may include a main VTM having fixed connections to the array input and output and an auxiliary VTM being connected between a series-connection with the main VTM or disconnected from the array via the configuration switches. A linear regulator may be connected between the array output and the load. A linear regulator may be connected between the input source and the array input.

In general, another aspect features an apparatus for converting power from an input source for delivery to a load, where the load may vary over a normal operating range. The apparatus includes an integrated adaptive array having an input, an output, a number, N, of input cells each having a respective number, $P_x$, of turns and a number, M, of output cells each having a respective number, $S_x$, of turns, where N+M is greater than 2. Magnetic coupling between the turns forms a transformer common to each of the input and output cells. Configuration switches are connected to configure the cells in and out of a series connection. The apparatus is adapted to configure the cells in and out of the series connection such that the turns of selected ones of the input cells are adaptively connected in series and the turns of selected ones of the output cells are adaptively connected in series to provide an adaptively adjustable transformer turns ratio, which is a function of the ratio of (a) the sum of the number of turns in the selected ones of the series-connected output cells to (b) the sum of the number of turns in the selected ones of the series-connected input cells.

Implementations of the apparatus may include one or more of the following features. The number, M, of output cells may equal 1 and the configuration switches may be connected to the input cells. The number, N, of input cells may equal 1 and the configuration switches may be connected to the output cells. A resonant circuit may include the transformer and have a characteristic resonant frequency and period. Two or more primary switches in at least one of the primary cells may be adapted to drive the resonant circuit. A switch controller may be adapted to operate the primary switches in a series of converter operating cycles. Each converter operating cycle may be characterized by two power transfer intervals of essentially equal duration, during which one or more of the primary switches are ON and power is transferred from the input of the integrated adaptive array to the output of the integrated adaptive array via the transformer. Voltages and currents in the adaptive array may rise and fall at the characteristic resonant frequency. Each converter operating cycle may be further characterized by two energy-recycling intervals each having an essentially constant duration over the normal operating range during which the primary switches are OFF. Magnetizing current may be used to charge and discharge capacitances during the energy-recycling intervals. The switch controller may be adapted to turn the primary switches OFF essentially at times when the current in a secondary winding returns to zero. The cells may be configured in response to changes in the adaptive array input voltage. The cells may be configured in response to changes in the adaptive array output voltage. The input or output cells may have a number of turns that form a binary series. The input cells may have a number of turns that form a first binary series and the output cells may have a number of turns that form a second binary series. A main input cell may have a fixed connection to the integrated adaptive array input. An auxiliary input cell may be switched between a series-connection with the main input cell or disconnected from the integrated adaptive array input. A linear regulator may be connected between the integrated adaptive array output and the load. A linear regulator may be connected between the input source and the integrated adaptive array input. The number N may be at least 2 and two of the input cells may be arranged in a pair, including a first input cell and a second input cell. The first and second input cells may each have a positive-referenced switch and a negative-referenced switch connected to form a double-ended drive for the respective turns. The respective turns of the first and second input cells may be connected to induce opposing flux in the transformer when driven by their respective positive-referenced switches. A controller may be adapted to operate the switches of the first and second input cells substantially 180 degrees out of phase such that the positive-referenced switch of the first input cell and the negative-referenced switch of the second input cell are ON together and the negative-referenced switch of the first input cell and the positive-referenced switch of the second input cell are ON together. The switches may have a maximum voltage rating that is lower than the input voltage. N may be a multiple of 2 and all of the input cells may be arranged in pairs. The integrated adaptive array may be an adaptive VTM array and the adjustable transformer turns ratio may provide an adjustable voltage transformation ratio, $K=V_{out}/V_{in}$, where $V_{in}$ is the voltage across the integrated array input and $V_{out}$ is the voltage across the integrated array output.

In general, another aspect features a method of converting power from an input source at an input voltage for delivery to a load over a normal operating range. The method includes providing a number, N, of input cells, where N is at least 2, and arranging at least two of the input cells in pairs, each pair including a first input cell and a second input cell. Each input cell has a respective number, $P_x$, of turns. A number, M, of output cells each having a respective number, $S_x$, of turns is provided. Magnetic coupling is provided between the turns to form a transformer common to each of the input and output cells. A positive-referenced switch and a negative-referenced switch are provided in each of the first and second input cells to form a double-ended drive for the respective turns. The respective turns of the first and second input cells are connected to induce opposing flux in the transformer when driven by their respective positive-referenced switches. A controller is provided to operate the switches of the first and second input cells substantially 180 degrees out of phase such that the positive-referenced switch of the first input cell and the negative-referenced switch of the second input cell are ON together and the negative-referenced switch of the first input cell and the positive-referenced switch of the second input cell are ON together.

Implementations of the method may include one or more of the following features. A half-bridge configuration may be used for the first and second input cells. The positive-referenced switches and the negative-referenced switches may have a maximum voltage rating that is lower than the input voltage. The number of turns in the first input cell may equal the number of turns in the second input cell. The number M may equal 1 and the number N may equal 2. The number N may be a multiple of 2 and be greater than 2, and all of the input cells may be arranged in pairs.

In general, another aspect features an apparatus for converting power from an input source at an input voltage for delivery to a load over a normal operating range. The apparatus includes a number, N, of input cells, where N is at least 2, and at least two of the input cells are arranged in a pair. Each pair includes a first input cell and a second input cell and each input cell has a respective number, $P_x$, of turns. The apparatus includes a number, M, of output cells each having a respective number, $S_x$, of turns. Magnetic coupling is used between the turns to form a transformer common to each of the input and output cells. The first and second input cells each have a positive-referenced switch and a negative-referenced switch connected to form a double-ended drive for the respective turns. The respective turns of the first and second input cells are connected to induce opposing flux in the transformer when driven by their respective positive-referenced switches. A controller is adapted to operate the switches of the first and second input cells substantially 180 degrees out of phase such that the positive-referenced switch of the first input cell and the negative-referenced switch of the second input cell are ON together and the negative-referenced switch of the first input cell and the positive-referenced switch of the second input cell are ON together.

Implementations of the apparatus may include one or more of the following features. The first and second input cells may have a half-bridge configuration. The positive-referenced switches and the negative-referenced switches may have a maximum voltage rating that is lower than the input voltage. The number of turns in the first input cell may equal the number of turns in the second input cell. The number M may equal 1 and the number N may equal 2. The number N may be a multiple of 2 greater than 2, and all of the input cells may be arranged in pairs.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
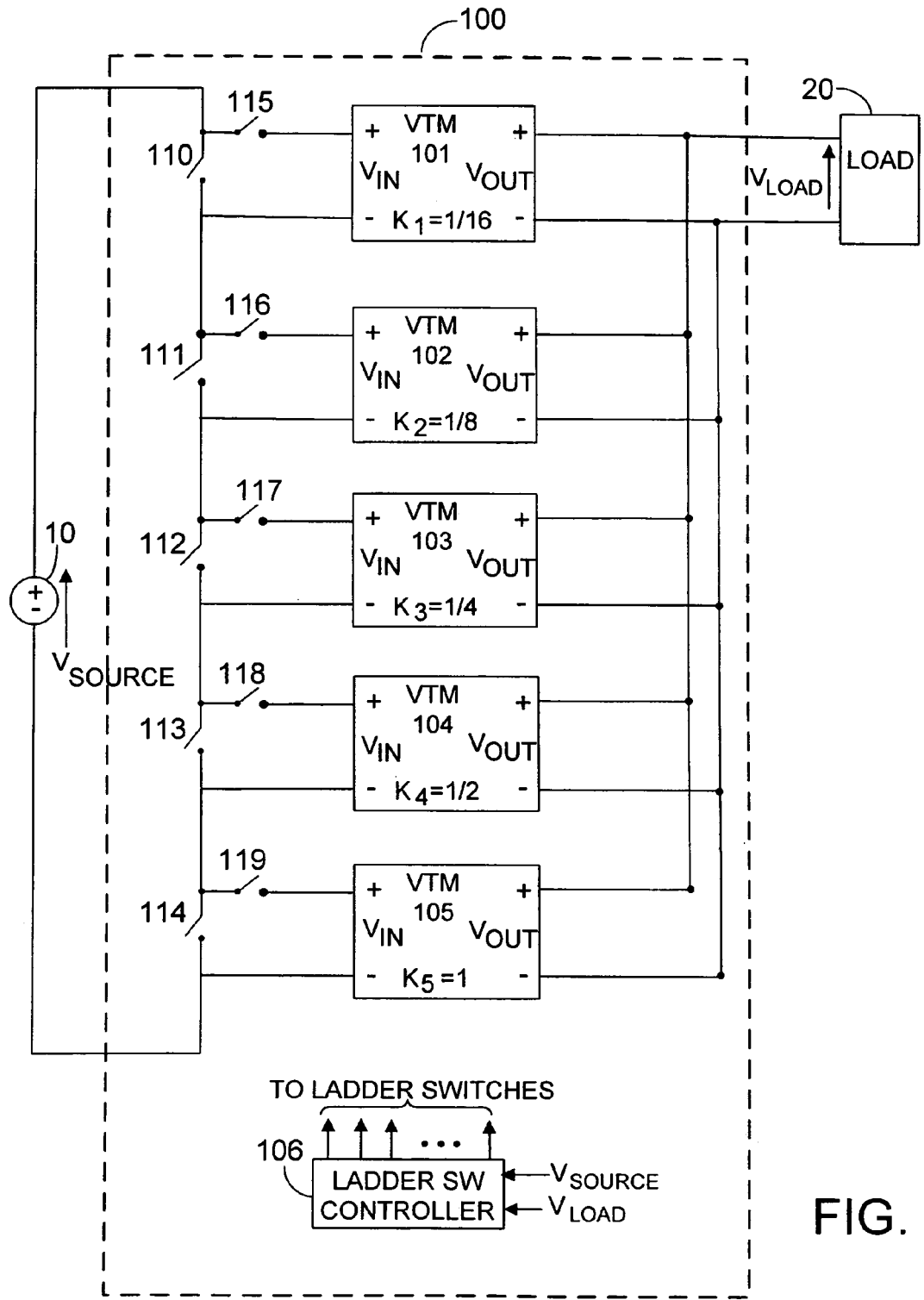
FIG. 1 shows an input-switched adaptive array of VTMs.

A Voltage Transformation Module ("VTM") as defined herein delivers a DC output voltage, $V_{out}$, which is a fixed fraction of the voltage, $V_{in}$, delivered to its input and provides isolation between its input and its output. The voltage transformation ratio or voltage gain of the VTM (defined herein as the ratio, $K=V_{out}/V_{in}$, of its output voltage to its input voltage at a load current) is fixed by design, e.g. by the VTM converter topology, its timing architecture, and the turns ratio of the transformer included within it. Vinciarelli, "Factorized Power Architecture With Point Of Load Sine Amplitude Converters," U.S. patent application Ser. No. 10/264,327, filed Oct. 1, 2002, (referred to herein as the "Factorized Application") assigned to the same assignee as this application and incorporated by reference, discloses preferred converter topologies and timing architectures for VTMs, which will be generally referred to as a Sine Amplitude Converter ("SAC") topology.

The SAC topology has many advantages over prior art DC-to-DC transformer topologies. The SAC topology may incorporate a "low Q" resonant tank (where the term "low Q" has the meaning given in the Factorized Application with respect to transformers for use in a SAC) and is nominally operated at resonance so that the reactive impedances of the elements of the resonant tank cancel each other out. The SAC uses a resonant topology at resonance so that the impedance of the resonant circuit becomes essentially resistive, minimizing the output impedance and open-loop resistance of the converter, and thus minimizing open-loop voltage droop as a function of changing load. Greater consistency in open-loop DC output resistance, owing to the elimination of dependency on reactive impedances, gives rise to fault tolerant power sharing attributes which are particularly desirable in applications in which multiple, paralleled, VTMs are operated as a power sharing array.

Operating waveforms in SAC converters closely approximate pure sinusoidal waveforms, thus optimizing spectral purity, and hence the converter's conducted and radiated noise characteristics. In operation, a SAC maintains an essentially constant conversion ratio and operating frequency as the amplitudes of its essentially sinusoidal voltage and current waveforms vary in response to a varying output load. The timing architecture of the SAC topology supports ZVS operation of the primary switches and ZCS and ZVS operation of the secondary switches, virtually eliminating switching losses in the primary switching elements and secondary switching elements, or rectifiers, particularly synchronous rectifiers, enabling higher switching frequencies and higher converter power density and efficiency. Sine Amplitude Converters provide the best combination of attributes to support the requirements of VTMs and high performance DC-DC converters.

VTMs and in particular SACs are capable of achieving very high power densities. The present application discloses methods and apparatus for adaptively configuring an array of VTMs, as the input voltage to the array of VTMs varies over a pre-defined range, in order to regulate the output voltage of the array.

A "digital" ladder array of VTMs 100 adaptively configurable to provide a regulated output voltage from an input source 10 is shown in FIG. 1. The adaptive VTM array 100 adjusts to changes in input voltage or changing output voltage requirements by selectively configuring the VTMs. The VTM outputs are connected in parallel to supply power to the load 20. Each VTM has a transformation ratio, K, selected to provide the necessary resolution. In the example of FIG. 1, VTMs 101, 102, 103, 104, and 105 have transformation ratios of 1/16, 1/8, 1/4, 1/2, and 1/1, respectively for a digital ladder (thus the reference to the array as a "digital" array). The VTM inputs are connected to receive power from the input source through controlled switches 110-119 which may be low resistance (FET) switches. The array 100 of FIG. 1 may be configured for an aggregate transformation ration of 1/1 to 1/31 in steps of 1 in the denominator by switching the VTM inputs in and out of the input circuit. A VTM is disconnected in FIG. 1 by closing its respective shunt switch (110-114) and opening its respective series switch (115-119). The VTMs that are disconnected may be disabled (i.e., rendered non-operating) until switched back into the circuit or may remain enabled. A ladder switch controller 106 senses the input voltage and configures the ladder switches to provide the necessary aggregate voltage transformation ratio to regulate the load voltage. The controller 106 may also sense the load or array output voltage as shown in FIG. 1.

The input voltage will divide across the series connected inputs of VTMs having their outputs connected in parallel in proportion to their respective individual transformation ratios. The voltage across the input of $VTM_n$ (in a series-connected-input and parallel-connected-output array) may be expressed as follows:

$$V_{in_n} = \frac{V_{Source}}{K_n} \times K_{aggr}$$

where $K_{aggr}$, the aggregate transformation ratio for the series-connected-input and parallel-connected-output array of VTMs, is the reciprocal of the sum of the individual transformation ratios of those VTMs that are connected in the array:

$$K_{aggr} = 1 \bigg/ \sum_{connected} \frac{1}{K_i}$$

Referring to the example of FIG. 1, assume that the array 100 is to deliver a nominal 2.3V to the load 20 from an input source 10 that may vary from 36V to 72V. At low line conditions with Vin=36V, the controller configures the switches (110, 116-119 open and 115, 111-114 closed) so that only the input of VTM 101 is connected across the input source and the other VTMs 102-105 are disconnected from the source. Since the only connected VTM is the one having $K_1$=1/16, the aggregate transformation ratio will be $K_{aggr}$=1/16 and the array will deliver $V_{out}$=$V_{Source}$ $K_{aggr}$=36/16=2.25V to the load. As the source voltage increases, the controller adaptively reconfigures the array to provide the necessary load regulation. For example, for a source voltage of 38V, the controller may reconfigure the array by connecting the inputs of VTMs 101 and 105 in series and disconnecting VTMs 102-104 (switches 110, 114, 116-118 open, 111-113, 115, 119 closed) to provide an aggregate transformation ratio $K_{aggr}$=1/(16+1)=1/17 and an output voltage $V_{out}$=$V_{Source}$ $K_{aggr}$=38/17=2.24V. At maximum input voltage, with Vin=72V, controller 106 configures the switches (110-114 open, 115-119 closed) to connect all of the VTMs in series. The aggregate transformation ratio will be $K_{aggr}$=1/(16+8+4+2+1)=1/31 and the array will deliver 72/31=2.32V to the load.

It will be appreciated that the adaptive digital ladder VTM array of FIG. 1 efficiently provides all of the classic functions of a DC-DC converter (including isolation, voltage step-up or step down, AND regulation) by adaptively configuring a series combination of VTM inputs to adjust the aggregate K factor, $K_{aggr}$. The number of VTMs in the array may be increased to provide greater resolution and thus better regulation. For example, an additional VTM (e.g., one having a transformation ratio K=2/1 or one having a transformation ratio K=1/32) may be added to further increase the resolution or the input range of the array. However, the minimum input or output operating voltage of the VTMs may impose a practical limitation on the resolution in the K, 2K, 4K digital ladder array of FIG. 1 because of practical limitations in achievable values of K in a VTM.

Figure 5A:
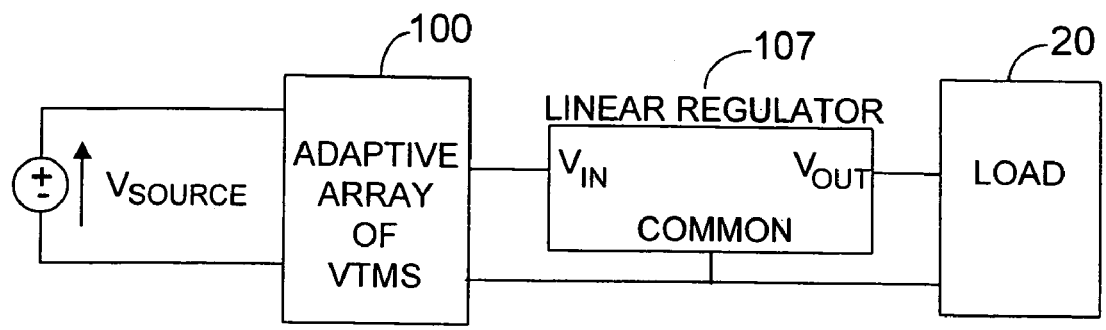
FIGS. 5A and 5B show use of a linear regulator with an adaptive array of VTMs.
Figure 5B:
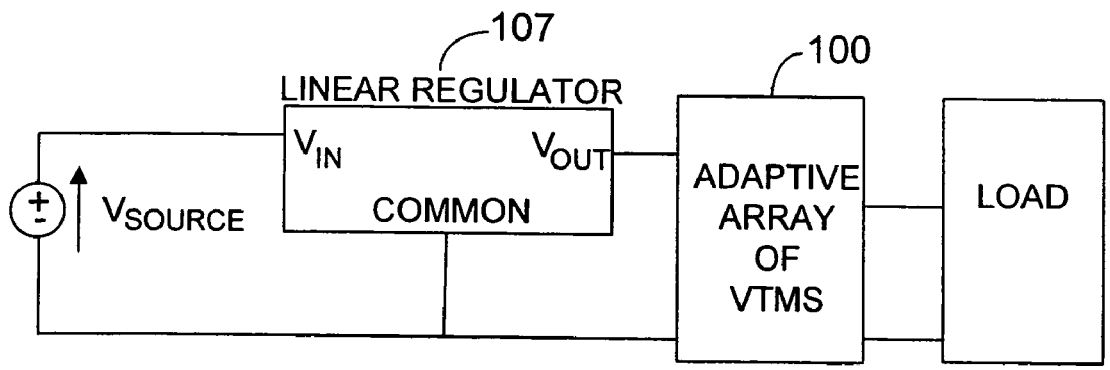

If the output voltage regulation requirement exceeds the resolution of an adaptive VTM array, finer regulation may be provided by an analog dissipative linear regulator in series with the input or output of a VTM array. FIGS. 5A and 5B, show a linear regulator 107 in series with the output and input, respectively, of adaptive array 100. If, for example, an adaptive VTM array can achieve a regulation resolution of 1 percent with a manageable number of bits, the dissipation associated with using an appropriately designed analog series linear regulator, e.g. 107, to absorb substantially all of the 1% VTM array error may be negligible in terms of the overall converter efficiency. In fact such a loss may be smaller than the loss associated with a series-connected switching regulator (e.g., a "PRM", as described in the Factorized Application, and that may, in some applications, use the topology described in Vinciarelli, "Buck-Boost DC-DC Switching Power Conversion," U.S. patent application Ser. No. 10/214,859, filed Aug. 8, 2002, both assigned to the same assignee as this application and incorporated by reference). Use of a series linear regulator also eliminates the response delays and switching noise that would be introduced by use of a series-connected switching regulator. The analog series linear regulator also may provide enough bandwidth to effectively filter "hash" or "digital jitter" that may be generated due to instances of reconfiguration of the array.

It may be preferable to provide the configuration switches on the higher voltage side of the array to reduce power dissipation in the switches. In the example of FIG. 1, the source voltage was stepped down by the array; therefore, the switches were placed on the input side of the array. In voltage step-up applications, the switches may be placed on the secondary side to produce a series connected secondary adaptive array.

Figure 2:
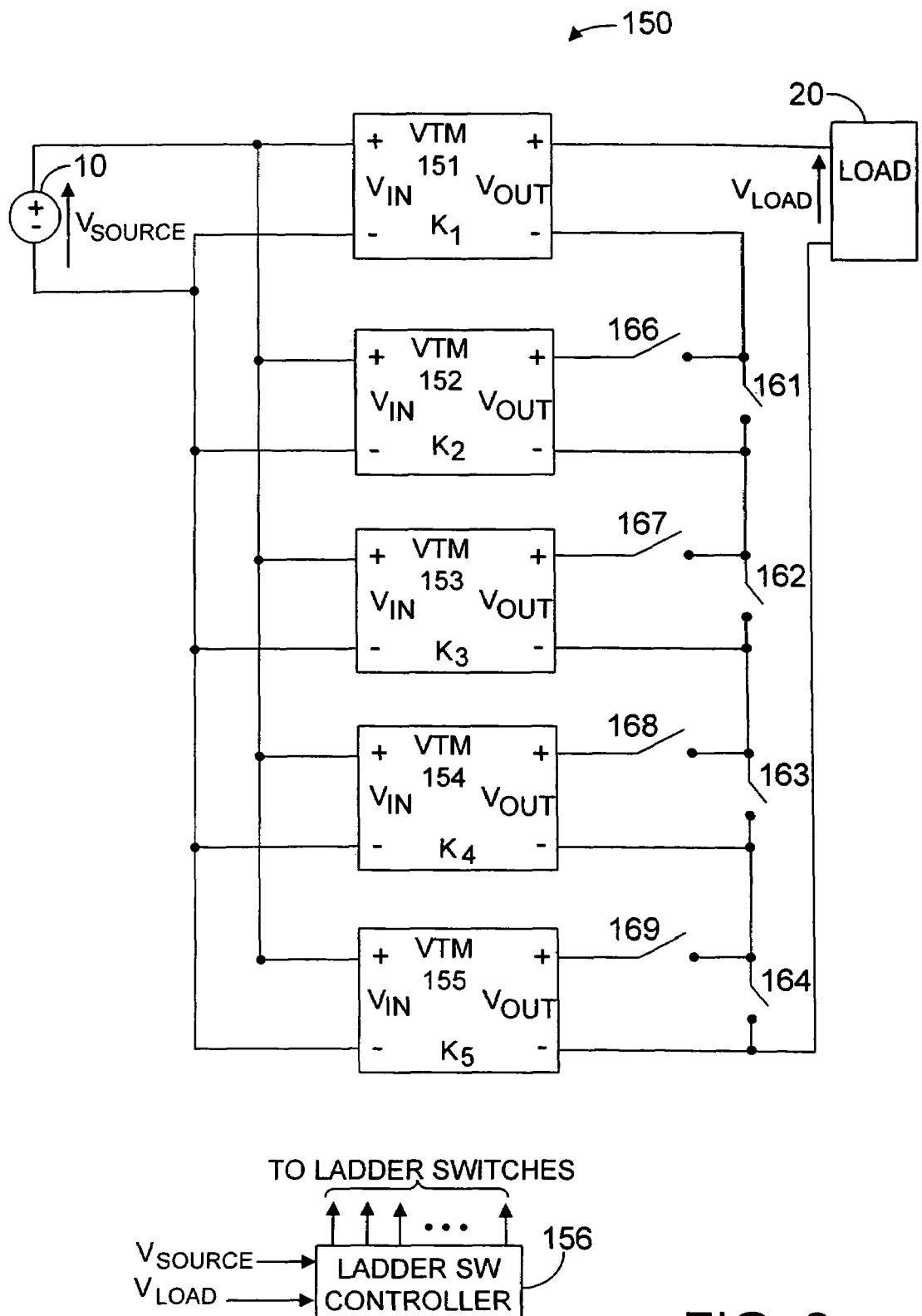
FIG. 2 shows an output-switched adaptive array of VTMs.

Referring to FIG. 2, an example of a step-up adaptive array 150 with configuration switches 161-164, 166-169 on the output side of the array is shown. The array 150 is designed to provide 48+/−1 Volt output from an input voltage range of 10-15V. For this application, the array must provide a minimum transformation ratio less than or equal to $K_{min}$:

$$K_{min} = \frac{V_{out_{max}}}{V_{in_{max}}} = \frac{48+1}{15} = 3.26$$

The array must also provide a transformation ratio greater than or equal to $K_{max}$:

$$K_{max} = \frac{V_{out_{min}}}{V_{in_{min}}} = \frac{48-1}{10} = 4.7$$

In order to satisfy the regulation requirement, the array must have a step size in the transformation ratio less than or equal to $\Delta K_{max}$:

$$\Delta K_{max} = \frac{\Delta V_{out}}{V_{in_{max}}} = \frac{49-47}{15} = .13$$

Finally, the array must provide a number of steps in the transformation ratio greater than or equal to $N_{steps}$:

$$N_{steps} = \frac{K_{max} - K_{min}}{\Delta K_{max}} = \frac{4.7 - 3.26}{.13} = 11.1$$

From the above calculations, a five VTM array will satisfy the design criteria. A four-bit K, 2K digital ladder having 15 steps will satisfy the $N_{steps}$ requirement. A step size of $\Delta K=1/8=0.125$ is less than and therefore satisfies the resolution requirement $\Delta K_{max}$ and provides an adjustment range $N_{steps} \times \Delta K = 15 \times 1/8 = 1.875$ that is greater than required. VTMs 152, 153, 154, and 155 will have the following respective transformation ratios $K_5=1/8$, $K_4=1/4$, $K_3=1/2$, and $K_{2=1}$. The transformation ratio of the main VTM 151 thus maybe set to $K_1=3$ which will easily satisfy the minimum requirement, $K_{min}$ and provide an aggregate transformation ratio for the array ranging from 3.0 to 4.875.

The inputs of the VTMs 151-155 are connected in parallel and the outputs are adaptively connected in series as needed to regulate the output voltage. Because the main VTM 151 is configured to deliver power continuously it does not have a series or shunt switch on its output (the array of FIG. 1 may also be adapted in this way). Auxiliary VTMs 152-155 are configured to form the four-bit K, 2K ladder whose switches are controlled by the ladder switch controller 156. The controller may sense the source and load voltages to better regulate the load voltage. It will be appreciated that array 150 provides 48V+/−2% over an input voltage range from 9.6V to 16.3V.

Figure 7:
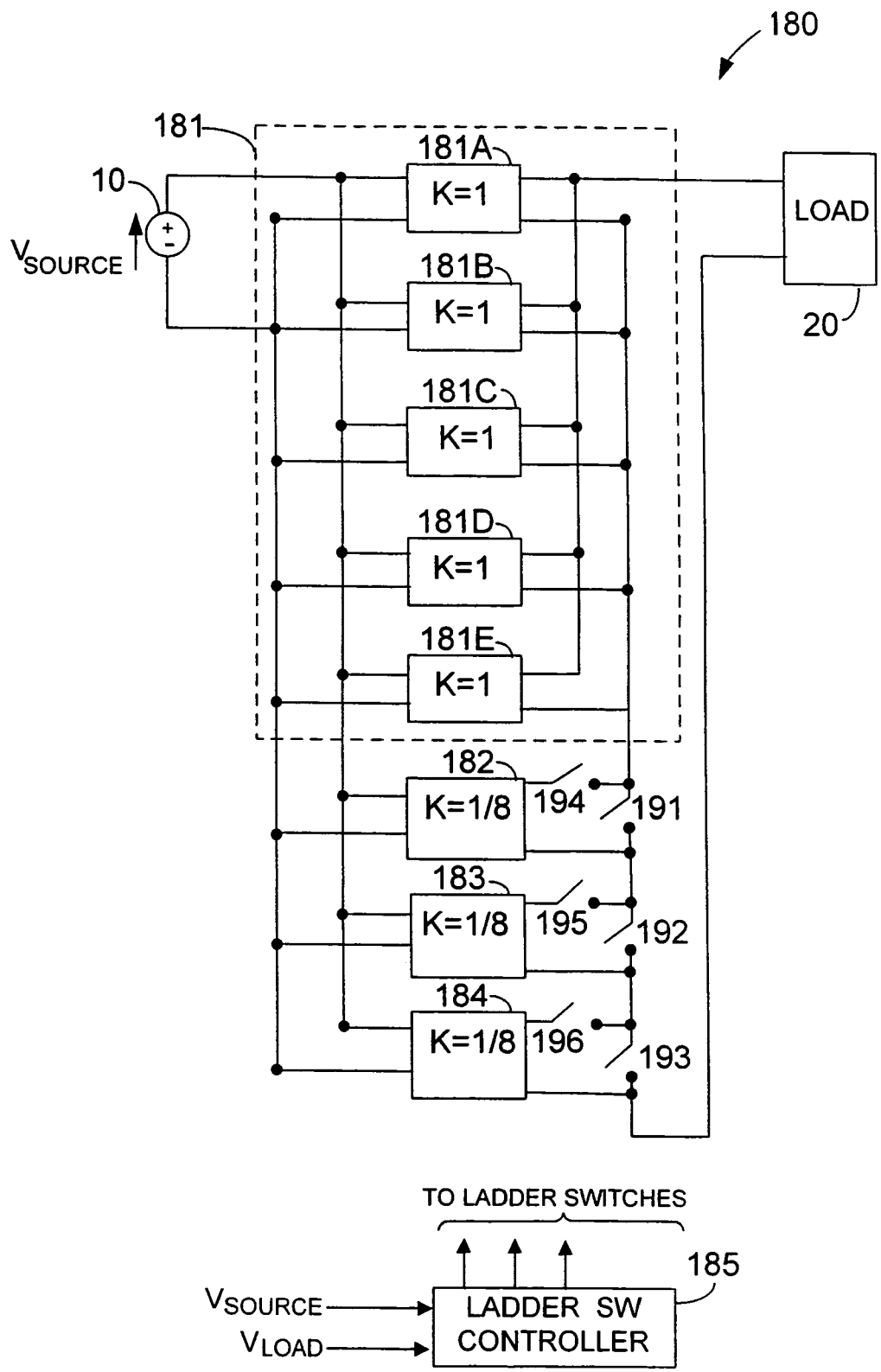
FIG. 7 shows a schematic of an output switched adaptive array of VTMs.

An example of an adaptive array comprising a power sharing sub-array of VTMs is shown in FIG. 7. The adaptive array 180 is designed to deliver 50 VDC+/−5V from an input source that varies from 38 to 55VDC. A power sharing sub-array 181, comprising VTMs 181A-181E, each having a transformation ratio K=1, supplies most of the power to the load. As the input voltage drops, the outputs of auxiliary VTMs 182-184, each of which has a transformation ratio of K=1/8, are switched in series with the output of the main array 181 by ladder switch controller 185. The aggregate transformation ratio of the adaptive array 180 varies from $K_{aggr}=1$ to 1.375 providing the necessary regulation. The auxiliary VTMs supply only a small fraction of the total power and therefore do not need to be connected in power sharing arrays for this application.

Figure 3:
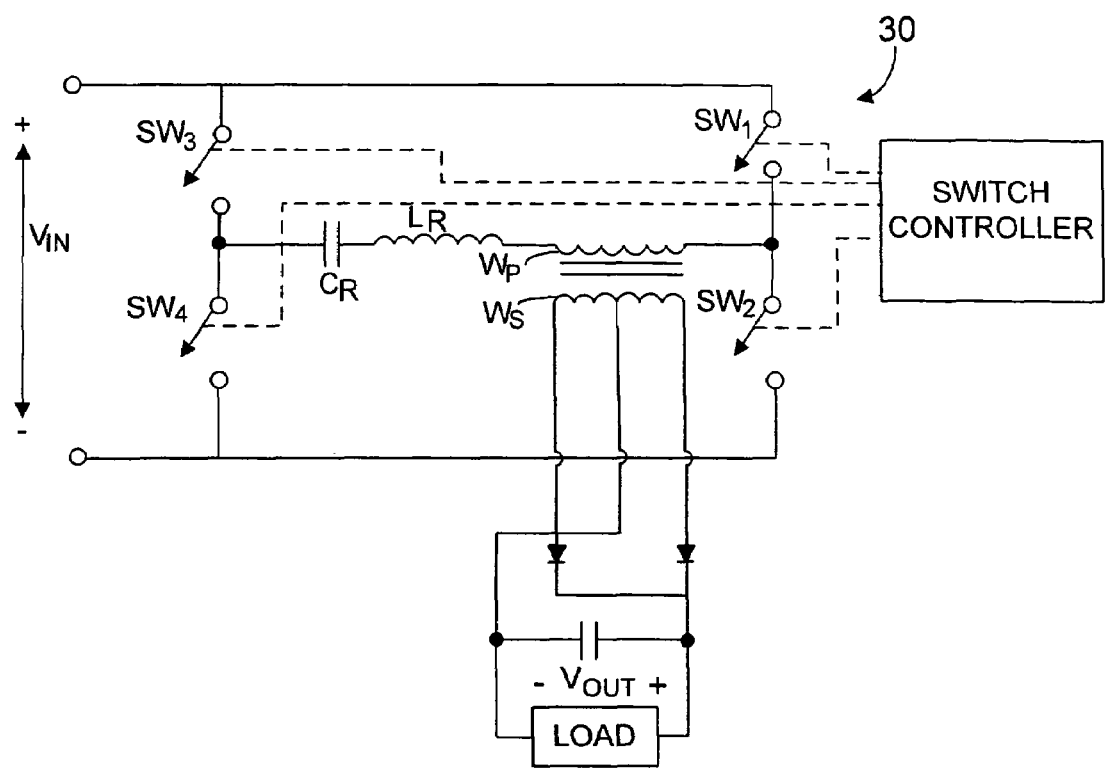
FIG. 3 shows a schematic diagram of a full-bridge SAC.

As described in conjunction with FIGS. 1-2 and 7, the adaptive VTM array concept may be realized with a multiplicity of separate VTMs having independent isolation transformers and appropriate K factors, with each such VTM separately controlled to operate at a respective switching frequency. However, the Sine Amplitude Converter ("SAC") is particularly well suited for use in an integrated version of an adaptive VTM array. A full-bridge SAC of the type described in the Factorized Application is shown in FIG. 3. The SAC includes one primary circuit and one secondary circuit. The primary circuit comprises transformer primary winding $W_P$, in series with resonant capacitance $C_R$, and resonant inductance $L_R$ (which may have a low Q (where the term "low Q" has the meaning given in the Factorized Application with respect to transformers for use in a SAC) and may partially or entirely consist of the primary reflected leakage inductance of the transformer) driven by primary switches S1, S2, S3, S4. The switches S1, S2, S3, S4, are controlled by the switch controller to operate at near resonance with short energy recycling intervals to provide zero voltage switching. The output circuit, which includes the transformer secondary winding $W_P$, coupled to a rectifier circuit and a filter capacitor, supplies power to the load.

Figure 4:
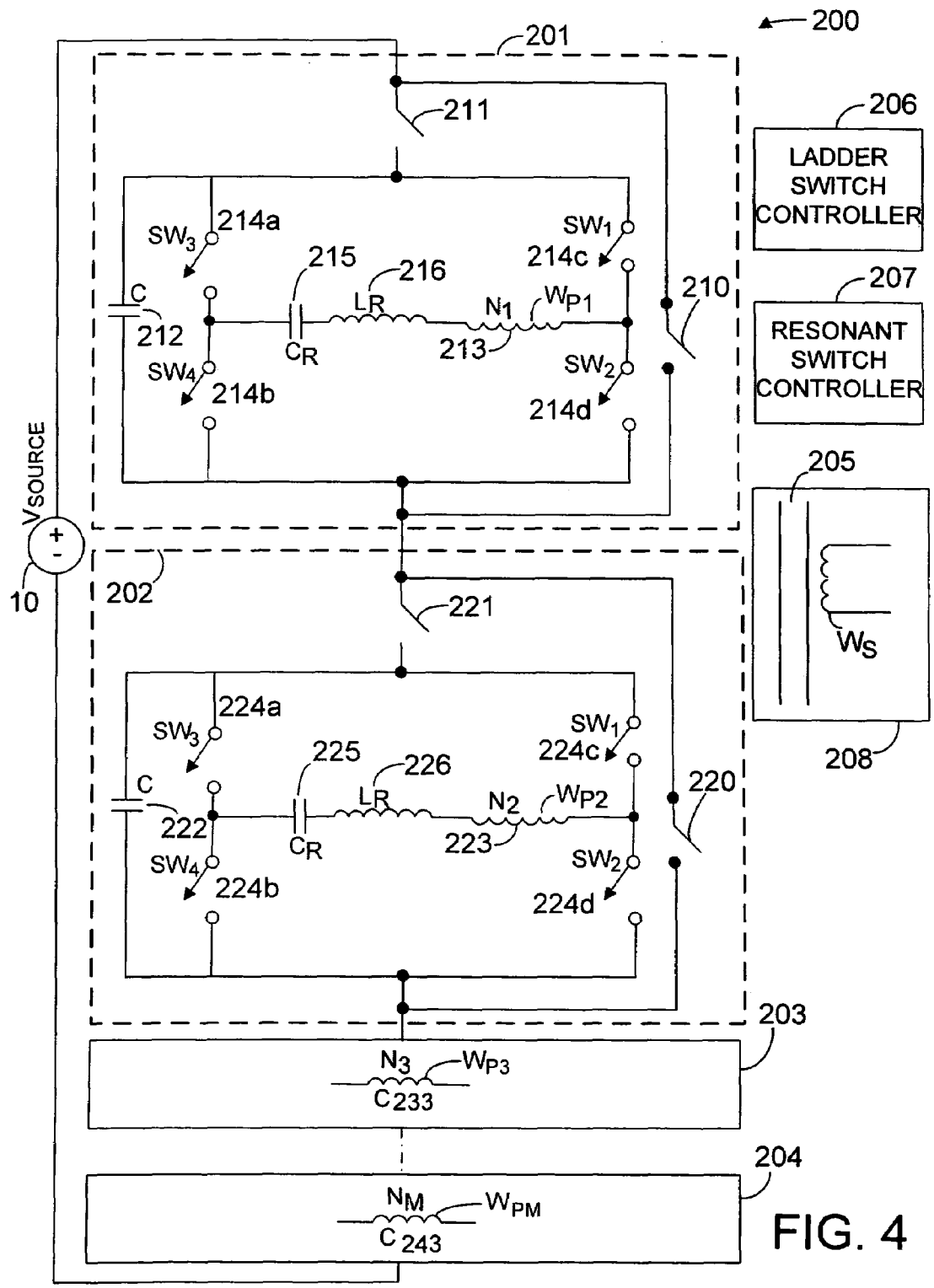
FIG. 4 shows a schematic diagram of a modified SAC with an adaptive array of input cells integrated with a common output circuit.

Referring to FIG. 4, an integrated adaptive array 200 using the SAC topology is shown having a plurality of full-bridge SAC input cells 201, 202, 203, 204 coupled to a common SAC output cell 208. The input cells may be the same as the primary circuit of FIG. 3 with the addition of a bypass capacitor, e.g. capacitors 212 and 222, a series switch, e.g. series switches 211, 221, and a shunt switch, e.g. shunt switch 210, 220 for each cell. Also the primary windings $W_{P1}$, $W_{P2}$, $W_{P3}$, ... $W_{Pm}$ may be part of one transformer 205 having a single secondary winding $W_S$ coupled to the output circuit 208. The number of turns $N_1$, $N_2$, $N_3$, ... $N_m$ in the primary windings may be selected to provide the appropriate transformation ratio for each cell. Using the K, 2K digital ladder example of FIG. 1, the integrated adaptive array SAC 200 could have five input cells having respectively 16 turns, 8 turns, 4 turns, 2 turns and 1 turn. A resonant switch controller 207 common to all of the cells may operate the primary switches $S_1$-$S_4$ of all of the cells (and the synchronous rectifiers in the output cells if used) in synchronism.

The input cells are switched in and out of the series combination as required to adjust the aggregate transformation ratio and thus regulate the output voltage as discussed above in connection with FIG. 1. When an input cell is in the circuit, its series switch e.g. 211, 221 is closed and its shunt switch e.g. 210, 220 is open. Conversely, when an input cell is switched out of the circuit its series switch e.g. 211, 221 is open and its shunt switch e.g. 210, 220 is closed. The ladder switch controller 206 controls the series and shunt switches of all of the cells. An input cell that is switched out of the circuit may remain active (i.e., its primary switches continue to operate) which will keep its respective bypass capacitor, e.g. capacitor 212, 222, charged to the appropriate voltage (due to the bi-directional nature of the SAC topology) thereby eliminating in-rush current problems during reconfiguration of the digital ladder. The ladder switch controller 206 may sense the input voltage and optionally may also sense the load voltage to configure the input cells. When in connected in series, each input cell shares in a fraction of the input voltage equal to the number of its primary winding turns divided by the total number of turns for all of the input cells that are connected in the array (i.e., where the term "connected" refers to cells whose shunt switches are open and whose series switches are closed).

Figure 6:
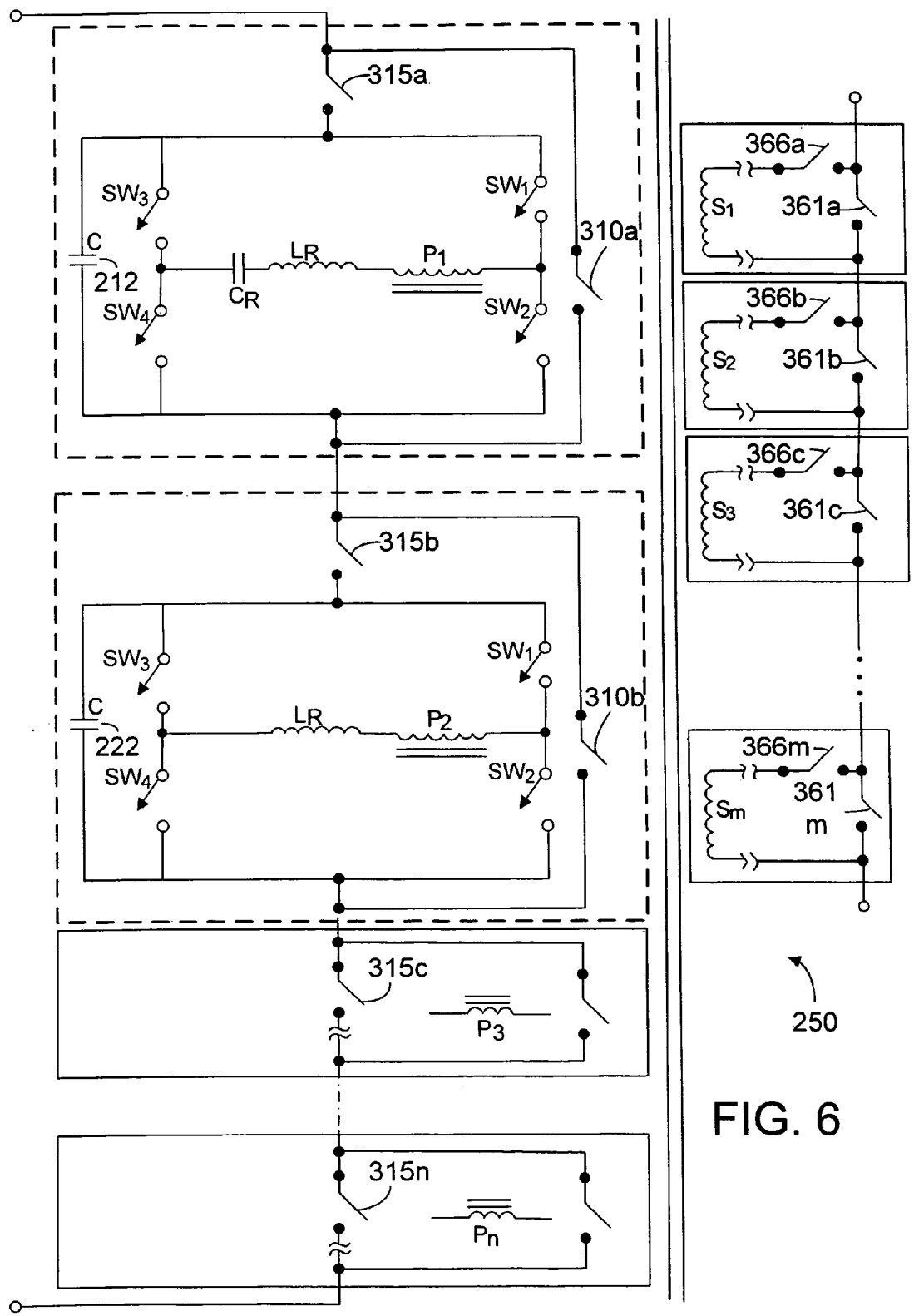
FIG. 6 shows a schematic diagram of an array of VTM cells with the inputs and outputs adaptively configured in series to provide output regulation.

A more elaborate integrated adaptive array 250 may incorporate a plurality of input cells and a plurality of output cells as shown in FIG. 6. In FIG. 6, a series of VTM input cells are adaptively stacked on the input (by means of primary series switches 315a-315n and primary shunt switches 310a-310n analogous to, respectively, switches 115-119 and 110-114 in FIG. 1) and a series of VTM output cells are adaptively stacked on the output (by means of secondary series switches 366a-366m and secondary shunt switches 361a-361m analogous to, respectively, switches 166-169 and 161-164 in FIG. 2) to adaptively adjust the effective VTM K factor. Because a common transformer comprising primary windings $P_1$-$P_n$ and secondary windings $S_1$-$S_m$, is used for all of the cells, any combination of input and output cells may be combined to provide the requisite transformation ratio. In general, the integrated adaptive array of FIG. 6, provides an aggregate K expressed as:

$$K_{aggr}=(S_1+S_2+\ldots+S_m)/(P_1+P_2+\ldots+P_n)$$

corresponding to a truncated series combination of connected output cells having $S_x$ transformer turns and a truncated series combination of connected input cells having $P_x$ transformer turns, where the term "connected" has the definition given above). As discussed above, the integrated adaptive array adjusts to changes in input voltage or changing output voltage requirements by adaptively configuring the input and/or output cells in series. It will be appreciated that the generalized adaptive array of FIG. 6 may be modified to use a single input cell with a plurality of output cells (analogous to the VTM array of FIG. 2) or alternatively a single output cell with a plurality of inputs cells (as discussed above in connection with FIG. 4). Furthermore, some cells in such an array may be permanently connected and not include series and shunt switches.

An integrated adaptive array based upon the SAC converter topology, such as the arrays shown in FIGS. 4 and 6, may preserve all of the key SAC features, including, in particular: a) the benefits of low Q resonant transformers for efficient high frequency power processing (where the term "low Q" has the meaning given in the Factorized Application with respect to transformers for use in a SAC); b) extremely high power density (exceeding or of the order of 1KW/in$^3$); c) absence of serial energy storage through an inductor (as required by classic switching regulators) leading to fast (<<1 microsecond) transient response; d) fast bidirectional power processing leading to effective bypass capacitance multiplication; and e) low noise performance owing to the ZCS/ZVS characteristics of SACs. Additional advantages, such as reduced size and cost may be realized by integrating the array within a single package using, e.g., the packaging and transformer design and layout techniques described in the Factorized Application; in Vinciarelli et al, "Power Converter Package and Thermal Management," U.S. patent application Ser. No. 10/303,613, filed Nov. 25, 2002; and in Vinciarelli, "Printed Circuit Transformer," U.S. patent application Ser. No. 10/723,768, filed Nov. 26, 2003, all assigned to the same assignee as this application and incorporated by reference.

Figure 8:
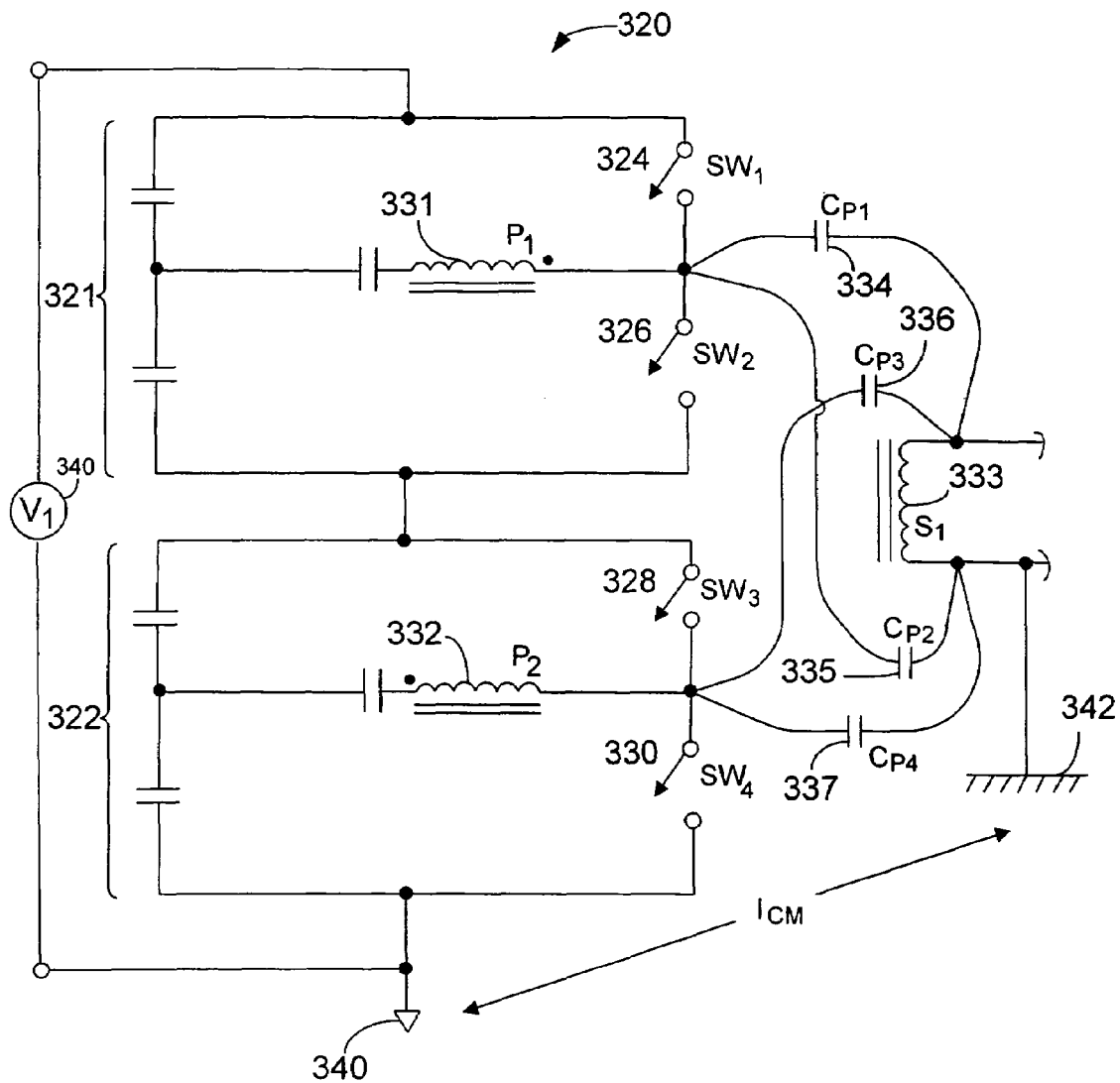
FIG. 8 shows a converter topology using a complementary pair of input cells.

FIG. 8 shows an array 320 comprising two half-bridge input cells 321, 322 connected in series to receive power from an input source 340 having a voltage, $V_1$. Primary windings 331, 332 (having $P_1$ and $P_2$ turns respectively) and secondary winding 333 (having $P_2$ turns) form part of a common transformer. Each input cell includes a positive-referenced switch 324, 328 and a negative-referenced switch 326, 330 providing doubled-ended drive for primary windings 331, 332. The input cells 321, 322 are arranged in a pair with the polarity of the primary windings reversed. The pair of input cells 321, 322 produce opposing flux when driven by their respective positive-referenced switch 324, 328. In operation, the switches in the pair of input cells are operated 180 degrees out of phase in synchronism so that switches SW1 324 and SW4 330 are closed at essentially the same time (when switches SW2 326 and SW3 328 are open) and switches SW2 326 and SW3 328 are closed at essentially the same time (when switches SW1 324 and SW4 330 are open).

One benefit of the complementary pair of input cells is that common-mode currents that would otherwise be capacitively coupled between primary windings, 331, 332, and secondary winding, 333, as illustrated by the flow of current $I_{CM}$ between primary 340 and secondary 342 grounds in FIG. 8, will be reduced. In illustration, FIG. 8 incorporates several representative parasitic capacitances, $C_{P1}$ through $C_{P4}$ 334-337. When switches SW2 and SW3 are opened, the rate-of-change of voltage across parasitic capacitors $C_{P1}$ 334 and $C_{P2}$ 335 will be positive and the rate-of-change of voltage across parasitic capacitors $C_{P3}$ 336 and $C_{P4}$ 337 will be negative and the net flow of current in the capacitors will tend to cancel. Likewise, the currents in the parasitic capacitors will also tend to cancel when switches SW1 and SW4 are opened. The net common-mode current, $I_{CM}$, flowing between the primary and secondary side of the array can be reduced using this arrangement.

Another advantage of the topology of FIG. 8 is that, for a given input source 340 voltage, $V_1$, the use of a pair of input cells allows use of primary switches (e.g., switches SW1-SW4, FIG. 8) having a breakdown voltage rating that is one-half of the rating that would be required if a single input cell were used. In one aspect, lower voltage primary switches (e.g. MOSFETs) may generally have lower levels of energy stored in the parasitic switch capacitances allowing the peak value of magnetizing energy to be set to a lower value while still enabling zero-voltage switching. For a given conversion efficiency, a reduction in magnetizing energy and current may enable operation at a higher frequency leading to higher power density and a smaller size for the converter. On the other hand, for a given operating frequency, a reduction in magnetizing current may provide for higher conversion efficiency. In another aspect, the use of a pair of input cells in place of a single input cell may allow use of lower cost, higher performance switches. For example, in "off-line" applications the input source voltage, $V_1$, may be 370 VDC. In such applications use of a pair of input cells enables use of primary switches having a 200 V breakdown rating, in contrast to the 400 V primary switch rating that would be required in an application using a single input cell.

A number of embodiments of the invention have been described. Nevertheless, it will be understood that various modifications may be made without departing from the spirit and scope of the invention. For example, it is not required that resonant capacitances $C_R$ and inductances $L_R$ be included in each of the SAC input cells, as is shown in FIG. 4; it is only necessary that at least one resonant capacitance and resonant inductance be provided (see, e.g., the integrated array of FIG. 6 in which a single resonant capacitance, shown in the uppermost primary cell and labeled $C_R$, is used). Although full bridge cells are shown in FIG. 4, the input cells may comprise any SAC configuration (e.g., full bridge, half bridge, push-pull). Different types of input cells may be combined in an adaptive array SAC. For example, a full-bridge input cell may be adaptively connected in series with a half-bridge input cell. Furthermore, power-sharing sub-arrays of VTMs and/or SACs may be configured in adaptive arrays to provide increased power capacity. The integrated adaptive array also may be used in other converter topologies to provide an adjustable transformer turns ratio which in the case of a VTM provides an adjustable voltage transformation ratio. Accordingly, other embodiments are within the scope of the following claims.

What is claimed is:

1. A method of converting power from an input source for delivery to a load, where the load may vary over a normal operating range, comprising:
   providing an integrated adaptive array having an input, an output, a number, N, of input cells each having a respective number, $P_x$, of turns and a number, M, of output cells each having a respective number, $S_x$, of turns, where N+M is greater than 2;
   providing magnetic coupling between the turns to form a transformer common to each of the input and output cells;
   adaptively configuring the cells in and out of a series connection such that the turns of selected ones of the input cells are adaptively connected in series and the turns of selected ones of the output cells are adaptively connected in series to provide an adaptively adjustable transformer turns ratio, which is a function of the ratio of (a) the sum of the number of turns in the selected ones of the series-connected output cells to (b) the sum of the number of turns in the selected ones of the series-connected input cells.

2. The method of claim 1 wherein the number, M, of output cells equals 1.

3. The method of claim 1 wherein the number, N, of input cells equals 1.

4. The method of claim 1 further comprising
   providing, in the integrated adaptive array, a method of converting power comprising:
   forming a resonant circuit including the transformer and having a characteristic resonant frequency and period;
   providing two or more primary switches in at least one of the input cells to drive the resonant circuit; and
   providing a switch controller to operate the primary switches in a series of converter operating cycles, each converter operating cycle characterized by
   (a) two power transfer intervals of essentially equal duration, during which one or more of the primary switches are ON and power is transferred from the input of the integrated adaptive array to the output of the integrated adaptive array via the transformer, and voltages and currents in the integrated adaptive array rise and fall at the characteristic resonant frequency.

5. The method of claim 4 wherein:
   each converter operating cycle is further characterized by (b) two energy-recycling intervals each having an essentially constant duration over the normal operating range during which the primary switches are OFF; and
   the method of converting power further comprises using magnetizing current to charge and discharge capacitances during the energy-recycling intervals.

6. The method of claim 5 wherein the method of converting power further comprises using the switch controller to turn the primary switches OFF essentially at times when the current in a secondary winding returns to zero.

7. The method of claim 1 further comprising sensing the integrated adaptive array input voltage and wherein the adaptive configuring is in response to changes in the integrated adaptive array input voltage.

8. The method of claim 1 or 7 further comprising sensing the integrated adaptive array output voltage and wherein the adaptive configuring is in response to changes in the integrated adaptive array output voltage.

9. The method of claim 1 wherein the input or output cells comprise a number of turns that form a binary series.

10. The method of claim 1 further comprising a main input cell having a fixed connection to the integrated adaptive array input.

11. The method of claim 10 further comprising an auxiliary input cell being adaptively configured between a series-connection with the main input cell or disconnected from the integrated adaptive array input.

12. The method of claim 1 further comprising providing a linear regulator between the integrated adaptive array output and the load.

13. The method of claim 1 further comprising providing a linear regulator between the input source and the integrated adaptive array input.

14. Apparatus for converting power from an input source for delivery to a load, where the load may vary over a normal operating range, comprising:
   an integrated adaptive array having an input, an output, a number, N, of input cells each having a respective number, $P_x$, of turns and a number, M, of output cells each having a respective number, $S_x$, of turns, where N+M is greater than 2;
   magnetic coupling between the turns to form a transformer common to each of the input and output cells;
   configuration switches connected to configure the cells in and out of a series connection;
   wherein the apparatus is adapted to configure the cells in and out of the series connection such that the turns of selected ones of the input cells are adaptively connected in series and the turns of selected ones of the output cells are adaptively connected in series to provide an adaptively adjustable transformer turns ratio, which is a function of the ratio of (a) the sum of the number of turns in the selected ones of the series-connected output cells to (b) the sum of the number of turns in the selected ones of the series-connected input cells.

15. The apparatus of claim 14 wherein the number, M, of output cells equals 1 and the configuration switches are connected to the input cells.

16. The apparatus of claim 14 wherein the number, N, of input cells equals 1 and the configuration switches are connected to the output cells.

17. The apparatus of claim 14 further comprising:
a resonant circuit including the transformer and having a characteristic resonant frequency and period;
two or more primary switches in at least one of the input cells adapted to drive the resonant circuit; and
a switch controller adapted to operate the primary switches in a series of converter operating cycles, each converter operating cycle characterized by
(a) two power transfer intervals of essentially equal duration, during which one or more of the primary switches are ON and power is transferred from the input of the integrated adaptive array to the output of the integrated adaptive array via the transformer, and voltages and currents in the adaptive array rise and fall at the characteristic resonant frequency.

18. The apparatus of claim 17 wherein:
each converter operating cycle is further characterized by
(b) two energy-recycling intervals each having an essentially constant duration over the normal operating range during which the primary switches are OFF; and
wherein magnetizing current is used to charge and discharge capacitances during the energy-recycling intervals.

19. The apparatus of claim 18 wherein the switch controller is adapted to turn the primary switches OFF essentially at times when the current in a secondary winding returns to zero.

20. The apparatus of claim 14 wherein the apparatus senses the integrated adaptive array input voltage and configures the cells in response to changes in the integrated adaptive array input voltage.

21. The apparatus of claim 14 or 20 wherein the apparatus senses the integrated adaptive array output voltage and configures the cells in response to changes in the integrated adaptive array output voltage.

22. The apparatus of claim 14 wherein the input or output cells comprise a number of turns that form a binary series.

23. The apparatus of claim 14 wherein the input cells comprise a number of turns that form a first binary series and the output cells comprise a number of turns that form a second binary series.

24. The apparatus of claim 14 further comprising a main input cell having a fixed connection to the integrated adaptive array input.

25. The apparatus of claim 24 further comprising an auxiliary input cell being connected between a series-connection with the main input cell or disconnected from the integrated adaptive array input.

26. The apparatus of claim 14 further comprising a linear regulator connected between the integrated adaptive array output and the load.

27. The apparatus of claim 14 further comprising a linear regulator connected between the input source and the integrated adaptive array input.

28. The apparatus of claim 14 wherein
N is at least 2 and at least two of the input cells are arranged in a pair, each pair comprising a first input cell and a second input cell;
the first and second input cells each having a positive-referenced switch and a negative-referenced switch connected to form a double-ended drive for the respective turns;
the respective turns of the first and second input cells being connected to induce opposing flux in the transformer when driven by their respective positive-referenced switches; and a controller adapted to operate the switches of the first and second input cells substantially 180 degrees out of phase such that the positive-referenced switch of the first input cell and the negative-referenced switch of the second input cell are ON together and the negative-referenced switch of the first input cell and the positive-referenced switch of the second input cell are ON together.

29. The apparatus of claim 28 wherein the positive-referenced switches and the negative-referenced switches comprise a maximum voltage rating that is lower than the integrated adaptive array input voltage.

30. The apparatus of claim 28 wherein N is a multiple of 2 and all of the input cells are arranged in pairs.

31. The method of claim 1 wherein
N is at least 2 and at least two of the input cells are arranged in a pair, each pair comprising a first input cell and a second input cell; and
further comprising:
providing, in each of the first and second input cells, a positive-referenced switch and a negative-referenced switch to form a double-ended drive for the respective turns;
connecting the respective turns of the first and second input cells to induce opposing flux in the transformer when driven by their respective positive-referenced switches;
providing a controller adapted to operate the switches of the first and second input cells substantially 180 degrees out of phase such that the positive-referenced switch of the first input cell and the negative-referenced switch of the second input cell are ON together and the negative-referenced switch of the first input cell and the positive-referenced switch of the second input cell are ON together.

32. The method of claim 31 further comprising providing the positive-referenced switches and the negative-referenced switches with a maximum voltage rating that is lower than the integrated adaptive array input voltage.

33. The apparatus of claim 31 wherein N is a multiple of 2 and all of the input cells are arranged in pairs.

34. The method of claim 31 further comprising providing a half-bridge configuration for the first and second input cells.

35. The method of claim 31 wherein the number of turns in the first input cell equals the number of turns in the second input cell.

36. The method of claim 31 wherein M equals 1 and N equals 2.

37. The method of claim 31 wherein N is a multiple of 2, N is greater than 2, and all of the input cells are arranged in pairs.

38. The apparatus of claim 28 wherein the first and second input cells further comprise a half-bridge configuration.

39. The apparatus of claim 28 wherein the number of turns in the first input cell equals the number of turns in the second input cell.

40. The apparatus of claim 28 wherein M equals 1 and N equals 2.

41. The apparatus of claim 28 wherein N is a multiple of 2, N is greater than 2, and all of the input cells are arranged in pairs.

42. The method of claim 1 or the apparatus of claim 14 wherein the integrated adaptive array comprises an adaptive VTM array and the adaptively adjustable transformer turns ratio provides an adaptively adjustable voltage transformation ratio, $K=V_{out}/V_{in}$, where $V_{in}$ is the voltage across the integrated adaptive array input and $V_{out}$ is the voltage across the integrated adaptive array output.

* * * * *

UNITED STATES PATENT AND TRADEMARK OFFICE
CERTIFICATE OF CORRECTION

PATENT NO.       : 7,420,825 B2
APPLICATION NO.  : 11/639716
DATED            : September 2, 2008
INVENTOR(S)      : Patrizio Vinciarelli It is certified that error appears in the above-identified patent and that said Letters Patent is hereby corrected as shown below:

Title Page 2, Other Publications, Column 1, line 2, delete "Conversino" and insert --Conversion--, therefor.

Title Page 2, Other Publications, Column 1, line 4, delete "Blackburg" and insert --Blacksburg--, therefor.

Title Page 2, Other Publications, Column 2, line 11, delete "DC-to-Dc", and insert --DC-to-DC--, therefor.

Column 2, line 19, delete "Wanderfeldröbhren" and insert --Wanderfeldröhren--, therefor.

Column 5, line 11, delete "$V_{out}$is" and insert --$V_{out}$ is--, therefor.

Column 10, line 10, delete "Vin" and insert --$V_{in}$--, therefor.

Column 10, line 26, delete "Vin" and insert --$V_{in}$--, therefor.

Column 11, line 58, delete "maybe" and insert --may be--, therefor.

Column 12, line 38, delete "S1, S2, S3, S4." and insert --$SW_1$, $SW_2$, $SW_3$, $SW_4$.--, therefor.

Column 12, line 39, delete "S1, S2, S3, S4," and insert --$SW_1$, $SW_2$, $SW_3$, $SW_4$,--, therefor.

Column 13, line 44, after "above" delete ")".

Column 14, line 24, delete "SW1 324 and SW4" and insert --$SW_1$ 324 and $SW_4$--, therefor.

Column 14, line 26, delete "SW2 326 and SW3 328 are open) and switches SW2 326" and insert --$SW_2$ 326 and $SW_3$ 328 are open) and switches $SW_2$ 326--, therefor.

Column 14, line 27, delete "SW3 328" and insert --$SW_3$ 328--, therefor.

UNITED STATES PATENT AND TRADEMARK OFFICE
CERTIFICATE OF CORRECTION

PATENT NO. : 7,420,825 B2
APPLICATION NO. : 11/639716
DATED : September 2, 2008
INVENTOR(S) : Patrizio Vinciarelli It is certified that error appears in the above-identified patent and that said Letters Patent is hereby corrected as shown below:

Column 14, line 28, delete "SW1 324 and SW 4 330" and insert --$SW_1$ 324 and $SW_4$ 330--, therefor.

Column 14, line 37, delete "SW2 and SW3are" and insert --$SW_2$ and $SW_3$ are--, therefor.

Column 14, line 43, delete "SW1 and SW4" and insert --$SW_1$ and $SW_4$--, therefor.

Column 14, lines 49-50, delete "SW1-SW4" and insert --$SW_1$-$SW_4$--, therefor.

Column 17, lines 36, Claim 22, line 36, delete "senes" and insert --series--, therefor.

Signed and Sealed this

Third Day of February, 2009

JOHN DOLL
*Acting Director of the United States Patent and Trademark Office*